United States Patent
Hanlon et al.

[19]

[11] Patent Number: 5,828,219
[45] Date of Patent: Oct. 27, 1998

[54] METHOD OF DETECTING FAULTS IN THE INSULATION LAYER OF AN INSULATED CONCEALED CONDUCTOR

[75] Inventors: Jason Julian Hanlon; Andrzej Zbigniew Regini, both of Bristol, United Kingdom

[73] Assignee: Radiodetection, Ltd., Bristol, United Kingdom

[21] Appl. No.: 909,547

[22] Filed: Aug. 12, 1997

[30] Foreign Application Priority Data

Aug. 22, 1996 [GB] United Kingdom ............... 9617605.2

[51] Int. Cl.⁶ .......................... G01R 31/12; G01V 3/11
[52] U.S. Cl. ..................... 324/529; 324/67; 324/71.2; 324/551; 324/326
[58] Field of Search ................ 324/67, 71.1, 71.2, 324/527, 528, 529, 551, 557, 326

[56] References Cited

U.S. PATENT DOCUMENTS

| | | | |
|---|---|---|---|
| 4,370,610 | 1/1983 | Allen et al. | 324/529 |
| 4,390,836 | 6/1983 | Bruce et al. | 324/529 |
| 4,438,389 | 3/1984 | De Sa | 324/529 |
| 4,710,708 | 12/1987 | Rorden et al. | 324/326 |
| 5,126,654 | 6/1992 | Murphy et al. | 324/71.2 |

FOREIGN PATENT DOCUMENTS

WO90/09601  8/1990  WIPO .
WO96/03664  2/1996  WIPO .

*Primary Examiner*—Diep N. Do
*Attorney, Agent, or Firm*—Woodbridge & Associates

[57] ABSTRACT

A system for detecting faults in the insulation layer surrounding a concealed conducting pipe (10) includes a signal generator (12) for applying an alternating current with a frequency of around 4Hz to the pipe, a magnetometer (102) for detecting the alternating current from the pipe (10) and a CPU (115) for identifying changes in the gradient of the detected current along the length of the concealed conducting pipe (10) which are caused by the faults in the insulation layer. The magnetometer (102) is used in connection with a locator(100) which detects a second alternating current applied to the pipe (10) by the signal generator (12), this second alternating current having a frequency of around 128Hz. The system can also use both these signals to determine the direction of the signals emulating from the pipe (10).

4 Claims, 3 Drawing Sheets

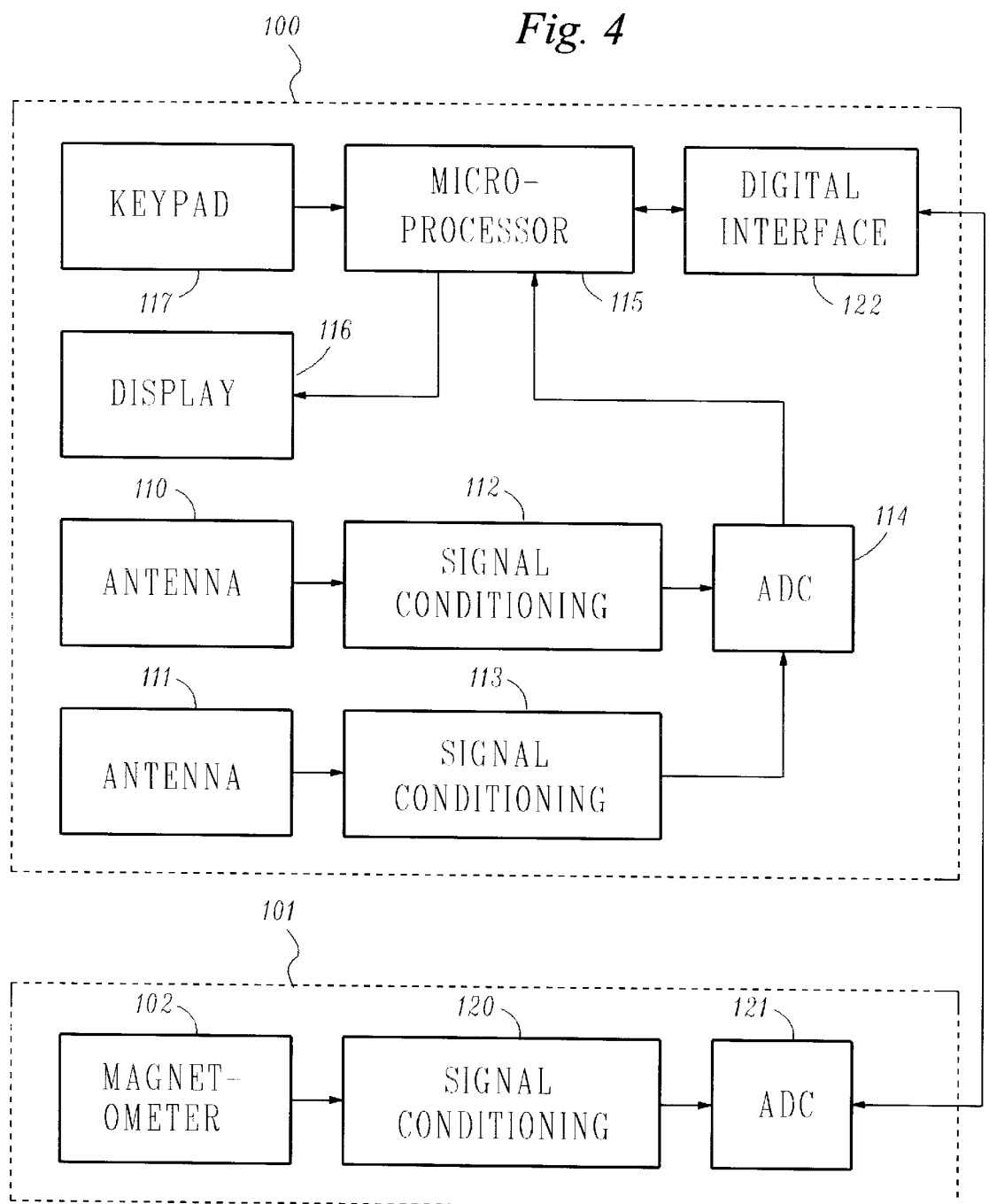

METHOD OF DETECTING FAULTS IN THE INSULATION LAYER OF AN INSULATED CONCEALED CONDUCTOR

BACKGROUND OF THE INVENTION

1. Field of the Invention

The present invention relates to an arrangement for detecting the condition of a concealed object, such as a buried metal pipeline.

2. Description of the Related Art

Buried metal pipelines are normally coated with a suitable layer of insulating material to act as a barrier to current flow between the pipe and ground, in order to minimise the possibility of electrolytic corrosion. To add further protection, the conventional use of cathodic protection systems applies a standing d.c. voltage of negative potential to the pipe, in order to ensure that any electrolytic corrosion that does occur in the event of coating defects or damages (often referred to as "holidays") is confined to ground beds which act as sacrificial anodes, and the positive terminals for the voltage. Such ground beds typically cover an area of tens of square meters near the cathodic protection application point.

Nevertheless, over a period of years, such holidays can result in pipe degradation, and it has been prudent practice to carry out regular surveys of pipe condition. Such surveys involve comparative measurement of resistance to ground of pipeline sections; by storing the information gained from successive surveys, any change in the condition of the pipe can be detected, and corrective action taken. A common method of carrying out such surveys is to inject an alternating current into the pipeline, and use a hand-held receiver firstly to locate the position of the pipe and then, by measuring depth and signal strength to determine the amplitude of the injected signal current at each position. From these measurements at known distances along the pipe, the rate of loss of signal current can be plotted. GB1577742 is one of a number of published documents illustrating this known technique.

Whilst the technique discussed above should, in theory, permit an accurate measurement to be made, it has been found in practice that the accuracy may not be sufficiently high. This is because the rate of signal loss over a distance may be small in comparison with measurement errors, the effect of interference and soil condition changes. The use of a.c. (usually between 100 Hz and 10 kHz) also reduces the effectiveness because there is continuous "leakage" of signal through the pipe/insulation/ground capacitance. Use of a.c. also encourages inductive coupling to other structures. As a result, a small change due to a holiday may be indistinguishable from a variation due to other causes, and therefore may go unnoticed until it is developed into a larger fault.

The location of a concealed cable can be achieved by the application of a low or zero frequency voltage signal to the cable, and detecting the signal with a magnetometer placed proximate to the cable. Such a system is described in WO 96/03664.

SUMMARY OF THE INVENTION

The present invention therefore proposes that, when the condition of an insulation layer of an insulated concealed conductor needs to be determined, a condition monitoring signal of very low frequency is applied to the conductor and detected by a magnetometer. The low frequency should normally be less than 10 Hz, and 4 Hz represents a suitable value. Because the frequency is very low, the inductive coupling between the signal and the antenna of a conventional locator is too low to permit accurate measurement. However, a magnetometer permits measurement of field strength at this low frequency. It has been found that such a low frequency is less subject to interference and distortion than higher frequencies. The holidays are detected by the identification of changes in the gradient of the detected field along the length of the insulated concealed conductor.

The disadvantage of the use of such a low frequency is that it may be too low for locating the pipe, as distinct from locating the fault. Therefore, a development of the present invention proposes that a second frequency is also applied to the concealed object. The second frequency is at least 10 Hz, typically 128 Hz, which is just above the predominant frequencies of ground currents resulting from power systems. The location of the object, and its depth, can then be ascertained with a conventional locator detecting the signal at the second frequency.

In a further development of the present invention, it is also possible to detect the direction of the signal current by analysing the signals of the two frequencies, using the techniques disclosed in EP-A-0457809. This permits accurate location by differentiating between signals from pipeline current flow and those emanating from signal current return in adjacent conductors.

Preferably, the magnetometer is physically separable from the locator, and is electrically connectable thereto. It also preferably has means to permit it to be mounted stably on a surface so that the magnetometer is horizontal. Multiple magnetometer arrangements may be used to determine the depth or vectorial position, if needed.

An embodiment of the present invention will now be described in detail, by way of example, with reference to the accompanying drawings, in which:

BRIEF DESCRIPTION OF THE DRAWINGS

FIG. 4 is a block circuit diagram of the locator of FIG. 3.

DETAILED DESCRIPTION OF THE INVENTION

Figure 1:
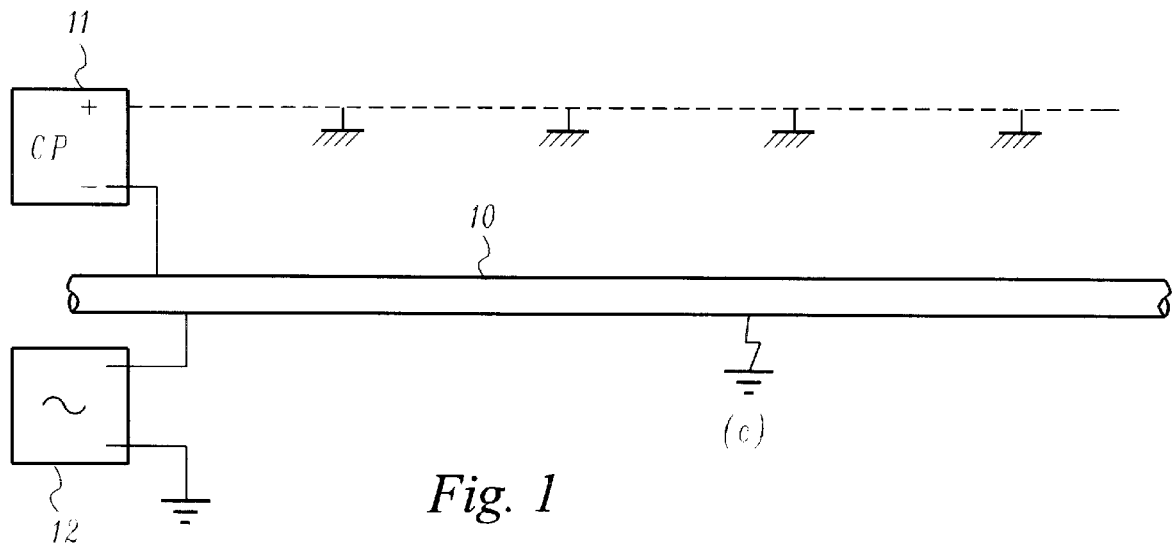
FIG. 1 gives a schematic view of a buried metal pipeline.

Referring first to FIG. 1, a pipeline 10 coated with a layer of insulating material has a standing d.c. voltage of negative potential applied to the coating by a voltage source 11. If there is a coating defect (a "holiday") at point c along the pipeline 10, there will be a change in the gradient of the variation of current with distance from the voltage source 11 as shown by curve of FIG. 2. Thus, existing techniques have relied on the measurement of current along the pipeline from the voltage source 11 to detect such holidays.

Figure 2:
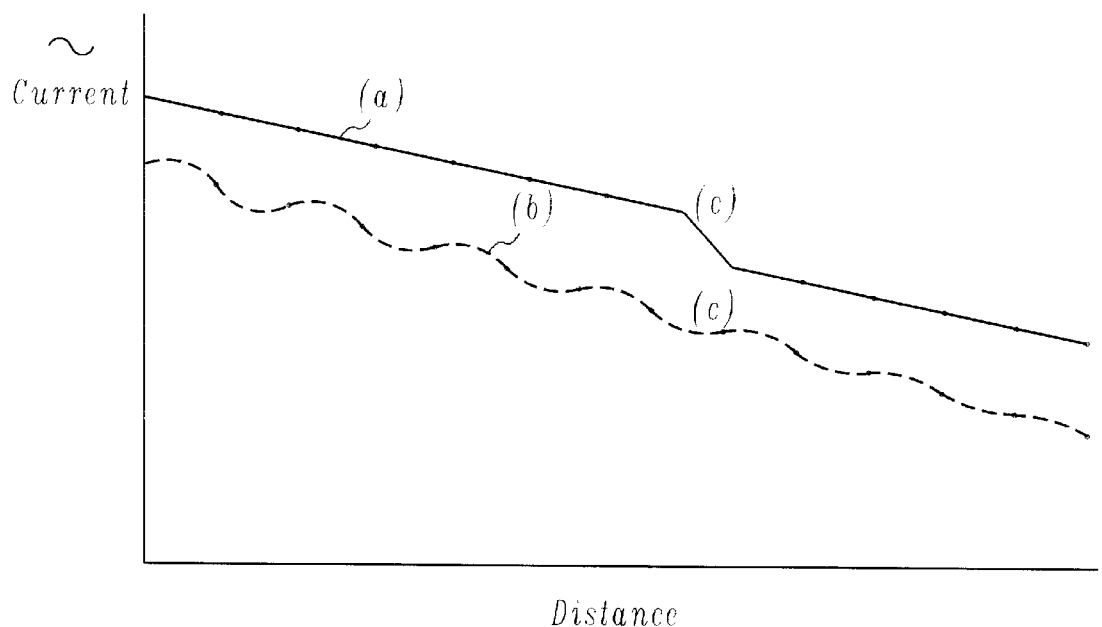
FIG. 2 is a graph showing the relationship between current and distance in the pipeline of FIG. 1.

However, in practice, the measurement of the current by existing a.c. techniques produces a current/distance graph corresponding to curve b in FIG. 2. The irregularity in curve b is caused by measurement errors, effects of interference, and soil condition changes. However, as can been seen from FIG. 2, it is then difficult to distinguish the change due to the holiday at point c from other variations in the curve b.

Therefore, the present invention proposes that an alternating source 12 is also connected to the pipeline, which applies a signal of very low frequency (e.g. 4 Hz) to the pipeline.

Figure 3:
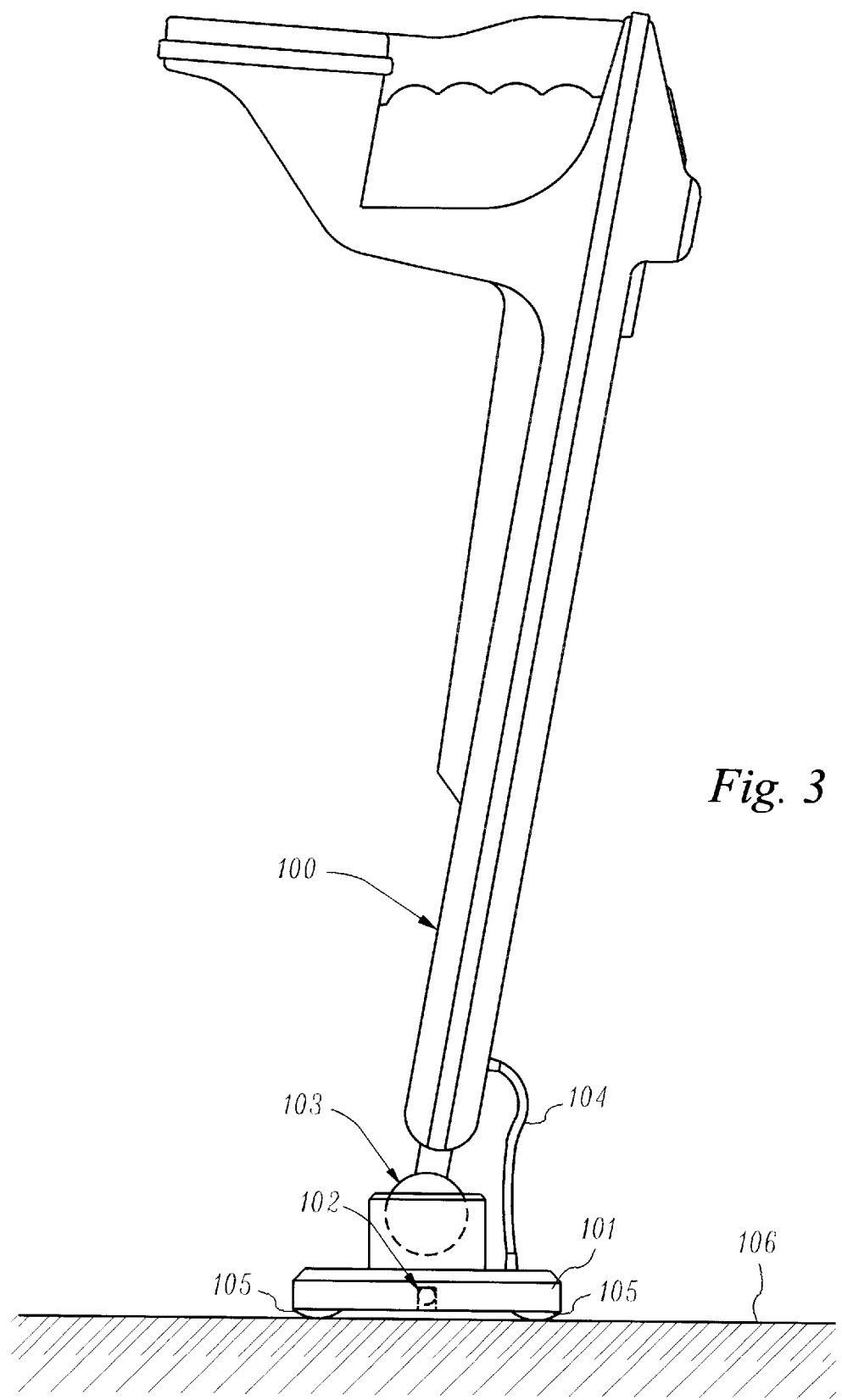
FIG. 3 shows a locator being an embodiment of the present invention for detecting the condition of the pipeline of FIG. 1.

The locator for detecting that signal is shown in more detail in FIG. 3. It comprises a main body 100 which, in the embodiment of FIG. 3, is generally similar to a conventional locator, for detecting a high frequency signal. However, in the embodiment shown in FIG. 3, a foot unit 101 is connected to the main body 100. That foot unit 101 contains a magnetometer 102 which is capable of detecting the low frequency signal. In the embodiment of FIG. 3, the foot unit 101 is physically connected to the main body 100 by a ball-and-socket joint 103, and the magnetometer 102 is electrically connected to components within the main body 100 by a cable 104.

It is important that the magnetometer does not move while measurements are carried out over several cycles. Therefore, the foot unit 101 has pads 105 which rest on the ground 106 and so support the foot unit 101, and hence the magnetometer 102, in place. The ball-and-socket joint 103 permits the foot unit 101 to remain in place, even if the main body 100 is moved slightly.

In addition, the voltage source 12 applies a second signal to the pipeline 10, of a higher frequency than the first signal, typically 128 Hz. This can be detected by the locator components in the main body 100 in a conventional way. This permits the pipe position and depth to be determined.

For monitoring purposes, a current regulated supply of signal is preferred.

FIG. 4 shows the electronic components of the locator of FIG. 3. The main body 100 contains circuitry which, with one exception to be described below, is conventional. Antennae 110, 111 detect the magnetic fields generated by the second signal injected into the pipeline. After passing through signal conditioning circuits 112, 113, the signals from the antennae 110, 111 are converted into digital signals by an analogue-to-digital circuit 114 and passed to a microprocessor 115. Using appropriate programs in the microprocessor 115, the signals from the antennae 110, 111 are analysed to detect the injected current. The microprocessor then controls a display to generate an appropriate display unit 116. The operator can control the microprocessor 115 using inputs via a keypad 117. In this way, the locator can detect the second signal. This structure is conventional.

The foot unit 101 contains, in addition to the magnetometer 102, a signal conditioning circuit 120 and an analogue-to-digital convertor 121. The digital signals are then passed to a digital interface 122 in the main body 100, which passes signals to the micro processor 115. Thus, when the magnetometer 102 detects the first signal, corresponding information is passed to the microprocessor 115 which can then generate a suitable display on the display unit 116.

The locator system can be designed to incorporate data logging functions, including if required position information from GPS satellite data, and means of retransmitting the logged data to a base station. By maintaining a continuous record of such data at the base station, it is possible to carry out computer comparison of successive surveys, and draw attention to apparent anomalies.

We claim:

1. A method of detecting faults in the insulation layer of an insulated concealed conductor, comprising the steps of:

(i) applying a first alternating current with a frequency of less than 10 Hz to the insulated concealed conductor;

(ii) detecting the field generated at a selected point along the concealed conductor with a magnetometer, the magnetometer being part of a detector;

(iii) applying a second alternating current with a frequency of more than 10 Hz to the insulated concealed conductor;

(iv) detecting the field generated by the second alternating current at said selected point along the concealed conductor with a magnetic field detector, said magnetic field detector being a further part of said detector;

(v) determining the depth of the concealed conductor at said selected point using said detected field generated by the second alternating current;

(vi) deriving the magnitude of the first alternating current at said selected point;

(vii) repeating steps (i) to (vi) for a plurality of selected points, the detector being moved between the plurality of selected points; and (viii) determining the variation of said first alternating current between said plurality of selected points, thereby to detect changes in the gradient of said variation of current, thereby to detect faults in the insulation layer.

2. A method according to claim 1, wherein the frequency of said first alternating current is 4 Hz.

3. A method according to claim 1, in which the frequency of the second alternating current is 128 Hz.

4. A method according to claim 1, wherein the method further comprises the step of analyzing the two detected fields at said selected point to determine the direction of the currents applied to the insulated concealed conductor.

* * * * *